A. M. George,
Circular Saw Mill.
Nº 9,532. Patented Jan. 11, 1853.
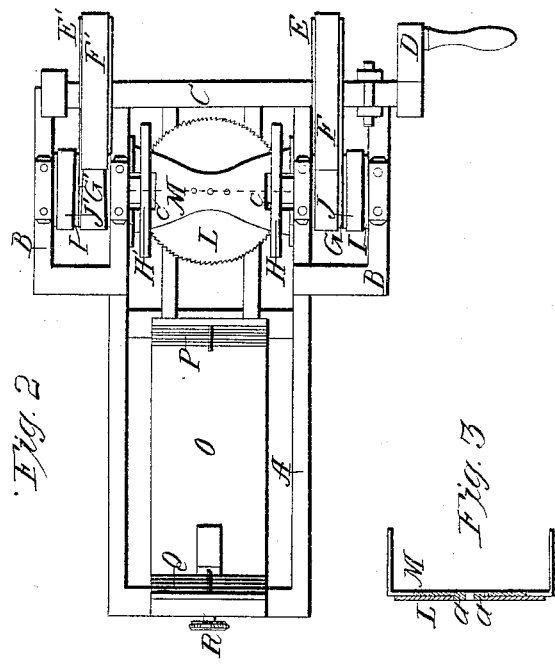
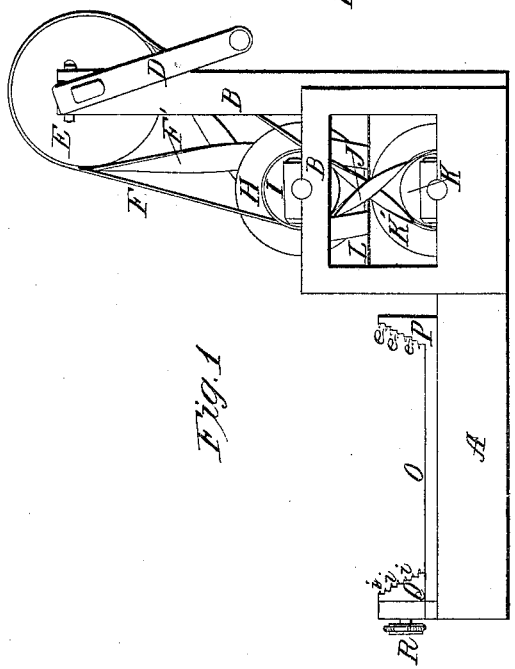

UNITED STATES PATENT OFFICE.

AMMI. M. GEORGE, OF NASHUA, NEW HAMPSHIRE.

MODE OF OPERATING CIRCULAR SAWS.

Specification of Letters Patent No. 9,532, dated January 11, 1853.

*To all whom it may concern:*

Be it known that I, AMMI. M. GEORGE, of Nashua, in the county of Hillsboro and State of New Hampshire, have invented certain new and useful Improvements in the Method of Hanging and Operating Circular Saws; and I do hereby declare the following to be a full, clear, and exact description of the same, reference being had to the accompanying drawings, making a part thereof, in which—

Figure 1, represents a side view, and Fig. 2, a top view of the apparatus. Fig. 3 represents a section through the saw, guard and its arbor, on which the saw runs.

Similar letters in the several figures denote like parts.

The nature of my invention consists in supporting and guiding a circular saw, which is driven by friction applied near its periphery, by means of a guard plate upon which is placed an arbor fitting a circular opening in the center of the saw plate, and around which the saw runs, by which means I am enabled to saw boards or veneers of a width almost equal to the diameter of the saw.

To enable others skilled in the art to make and use my invention I will proceed to describe the same with reference to the drawings.

A, represents the carriage frame, and B, the frame work for supporting the various parts for operating the saw, as well as the saw itself.

C, is a shaft provided with a crank D, by which it may be driven, or a belt and pulley may be used if found essential. Upon the shaft C, are placed two pulleys E, E', from which pass the belts F, F', over and around the pulleys G, G', arranged on the shafts which carry the top friction wheels H, H', for driving the saw. On the same shafts are arranged the pulleys I, I', over which pass the belts J, J', and thence over the pulleys K (one only being seen) arranged on shafts which carry each a driving friction wheel K', (one only being seen) below or on the underside of the saw, the under driving wheels being in all respects like the upper ones which are more clearly shown. The belts or bands should be so arranged by crossing or otherwise, as to give all the friction driving wheels a motion in the proper direction for driving the saw which they should bear against with sufficient pressure for that purpose, and the shafts upon which these friction wheels are placed should be made to dip slightly toward the saw, so that the pressure might be increased or diminished at pleasure, and the peripheries of the friction wheels may be covered with leather, India rubber, or other equally elastic or durable material, and should moreover be slightly beveled or conical, so as to allow for the difference of velocity of the different portions of the saw plate which they press against and to prevent any slipping which would wear away the saw.

The saw L, has a conical shaped hole in its center of suitable size, which hole should taper from the bottom toward the top of the saw. A conical shaped arbor $a$ is then made to fit this hole in the saw, and be flush with its underside, or that side next the log from which the slice is being cut. This arbor is passed through the saw and by means of rivets, is fastened to the guard plate M, by which means the saw may be run around the arbor as a support at its center without offering any obstruction in sawing to a width equal to the space between the friction wheels. The guard M, is a metal plate tapered off to an edge on both sides from the top, so that its outer edges fit close down to the saw plate, and that the board or veneer may pass up on the slightly inclined guard and rest thereon, leaving the saw free to run underneath it. Near its ends there are openings $c$, through which the friction wheels H, H' pass so as to press upon the saw and drive it, and its extreme ends are bent up and securely fastened to the frame. The arbor on the guard plate prevents the saw from slipping or moving horizontally, while the friction wheels above and below it hold it vertically.

The carriage O, may be moved back and forth by any of the usual well known methods, and either the head or tail block should be adjustable. I have herein represented the head block P, as fixed on the carriage, and the tail block Q, is made to slide on the carriage by means of a screw R, or its equivalent passing through the end of the carriage into said tail block. Both the head and tail block are stepped off into benches $e, e, e$, &c., each bench provided with a dog $i, i, i$, &c., for holding the piece to be sawed. The saw running around a fixed center, the log must of course be moved up to the saw, and as each piece is cut off the log is raised up on one of the steps of the head block, and the tail block pushed up to support the other end. This may be done by a screw, lever or its equivalent, operated by the power which drives the saw, or the carriage and log may be moved up together, the object being as in ordinary mills, to move up the material to the saw. By this arrangement a board or veneer may be cut off at each forward and backward movement of the carriage, thus losing no time in running back the log or carriage. I have represented the saw as running horizontally; it is obvious that it may be arranged vertically without changing any of the principles of my invention.

Having thus fully described my invention what I claim therein as new and desire to secure by Letters Patent is—

In combination with a circular saw driven by friction near its periphery, the guard plate with its arbor, around which the saw runs and by which it is held into the wood, and on which the board or veneer being sawed may rest, and relieve the saw from all friction therefrom, and by which means I am enabled to cut boards or veneers of nearly equal width with the diameter of the saw, substantially as described.

AMMI. M. GEORGE.

Witnesses:
FRANKLIN FLETCHER,
CABEL EMERY.